United States Patent
Wang

(10) Patent No.: US 9,904,061 B2
(45) Date of Patent: Feb. 27, 2018

(54) RASTER, DISPLAY APPARATUS AND METHOD OF MANUFACTURING THE RASTER

(71) Applicants: BOE TECHNOLOGY GROUP CO., LTD., Beijing (CN); BEIJING BOE DISPLAY TECHNOLOGY CO., LTD., Beijing (CN)

(72) Inventor: Junwei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/434,655

(22) PCT Filed: Mar. 28, 2014

(86) PCT No.: PCT/CN2014/074285
§ 371 (c)(1),
(2) Date: Apr. 9, 2015

(87) PCT Pub. No.: WO2015/120656
PCT Pub. Date: Aug. 20, 2015

(65) Prior Publication Data
US 2016/0018662 A1    Jan. 21, 2016

(30) Foreign Application Priority Data
Feb. 12, 2014    (CN) .......................... 2014 1 0049179

(51) Int. Cl.
*G02B 27/22* (2006.01)
*G02B 26/00* (2006.01)
(Continued)

(52) U.S. Cl.
CPC .......... *G02B 27/2214* (2013.01); *G02B 3/005* (2013.01); *G02B 3/0012* (2013.01);
(Continued)

(58) Field of Classification Search
CPC .... G02B 27/2214; G02B 3/0037; G02B 3/12; G02B 26/004; G02B 26/005; G02B 3/14;
(Continued)

(56) References Cited

U.S. PATENT DOCUMENTS 7,636,187 B2   12/2009   Morozumi et al.
8,587,857 B2   11/2013   Kuo et al.
(Continued)

FOREIGN PATENT DOCUMENTS

CN   1682143 A      10/2005
CN   101504486 A    8/2009
(Continued)

OTHER PUBLICATIONS

Office Action dated Jul. 30, 2015, for corresponding Chinese Application No. 201410049179.X.
(Continued)

*Primary Examiner* — Bumsuk Won
*Assistant Examiner* — Ephrem Mebrahtu
(74) *Attorney, Agent, or Firm* — Kinney & Lange, P.A.

(57) ABSTRACT

The present invention relates to the field of display technologies, and discloses a raster, a display apparatus and a method of manufacturing the raster. The raster comprises a first substrate and a second substrate arranged to be opposed to each other, a surface of the first substrate facing the second substrate is provided with a plate electrode thereon, a surface of the second substrate facing the first substrate is provided thereon with a plurality strip electrodes arranged to space apart from each other. A spacer wall is arranged to correspond to each strip electrode and located between the first substrate and the second substrate, the spacer wall comprises a conductive protrusion electrically connected with the strip electrode, and a hydrophilic-hydrophobic conversion material layer covering the conductive protrusion. Filled between every two adjacent spacer walls are liquid layers including a polar liquid layer and a non-polar liquid layer. With the technique solution of the present invention, an angle of view of the raster may be increased, and a cost of the raster reduced.

20 Claims, 3 Drawing Sheets

(51) Int. Cl.
  *G02B 3/12*  (2006.01)
  *G02B 3/00*  (2006.01)
  *G02B 3/14*  (2006.01)

(52) U.S. Cl.
  CPC ............ *G02B 3/0037* (2013.01); *G02B 3/12* (2013.01); *G02B 3/14* (2013.01); *G02B 26/005* (2013.01)

(58) Field of Classification Search
  CPC ... G02B 2207/115; G09G 3/348; G02F 1/167; B32B 2307/728; B32B 2307/73
  USPC .................................. 359/245–254, 290–296
  See application file for complete search history.

(56) References Cited

U.S. PATENT DOCUMENTS

| | | | | |
|---|---|---|---|---|
| 2005/0281682 A1* | 12/2005 | Paxton | ............... | F04B 19/006 417/53 |
| 2007/0012950 A1* | 1/2007 | Cain | ............... | B82Y 10/00 257/194 |
| 2008/0100922 A1* | 5/2008 | Choi | ............... | G02B 26/005 359/665 |
| 2010/0079839 A1* | 4/2010 | Mitsuda | ............... | G02B 26/005 359/228 |
| 2012/0194563 A1* | 8/2012 | Liang | ............... | G02B 26/005 345/690 |
| 2013/0057960 A1* | 3/2013 | Koshiishi | ............... | G02B 3/14 359/619 |
| 2013/0222880 A1* | 8/2013 | Nakasuga | ............... | G02B 26/005 359/290 |
| 2014/0097395 A1* | 4/2014 | Khan | ............... | H01L 51/102 257/1 |
| 2014/0139507 A1* | 5/2014 | Jung | ............... | G09G 3/348 345/212 |

FOREIGN PATENT DOCUMENTS

| | | |
|---|---|---|
| CN | 102269867 A | 12/2011 |
| CN | 102722022 A | 10/2012 |
| CN | 102937744 A | 2/2013 |
| CN | 103439790 A | 12/2013 |
| CN | 103558685 A | 2/2014 |
| JP | 2013142753 A | 7/2013 |

OTHER PUBLICATIONS

English Translation of Written Opinion in Chinese dated Oct. 24, 2014, for corresponding PCT Application No. PCT/CN2014/074285.
International Search Report in Chinese dated Oct. 10, 2014, for corresponding PCT Application No. PCT/CN2014/074285.
Written Opinion in Chinese dated Oct. 24, 2014, for corresponding PCT Application No. PCT/CN2014/074285.

* cited by examiner

RASTER, DISPLAY APPARATUS AND METHOD OF MANUFACTURING THE RASTER

BACKGROUND OF THE INVENTION

Field of the Invention

Embodiments of the present invention relate to a display apparatus, and particularly, to a raster for a display apparatus, a display apparatus and a method of manufacturing the raster.

Description of the Related Art

With continued development of liquid crystal display technologies, a 3D (Three-Dimensional) stereoscopic display technology has become a matter of great concern. A raster 3D display is formed by assembling a raster and a 2D (Two-Dimensional) display precisely. Raster 3D displays can be divided into slit raster 3D displays and lenticular lens raster 3D displays based on the types of rasters used in the displays, and they are used to control a propagation path of light in a certain way, such that different parallax images can be seen respectively by right and left eyes of a viewer, and the parallax images are combined into a stereoscopic image in human's brain.

In 3D display technology, a 3D display apparatus based on a liquid crystal raster has become a matter of great concern due to its advantages such as simple structure, good compatibility with liquid crystal processes, and good performance, wherein the liquid crystal raster-based 3D display apparatus achieves 3D stereoscopic display effects generally based on binocular parallax and light splitting principle of a raster structure, and usually comprises a display device and a liquid crystal raster arranged above the display device.

As shown in FIG. 1, it is a schematic structural diagram of a liquid crystal raster in prior arts. The raster comprises an upper substrate 11 and a lower substrate 12 arranged to be opposed to each other, and a liquid crystal layer 15 between the upper substrate 11 and the lower substrate 12, a surface of the upper substrate 11 facing the liquid crystal layer 15 is provided with strip electrodes 13 thereon, a surface of the lower substrate 12 facing the liquid crystal layer 15 is provided with a plate electrode 140 thereon. The plate electrode is grounded, and when preset periodical voltages are applied to strip electrodes at different positions, liquid crystals at different positions can be arranged in particular directions under an electric field, thereby achieving a space distribution of refractive indices of the liquid crystal layer. 3D display can be achieved when the distribution of refractive indices of the liquid crystal layer presents a distribution similar to a solid convex lens.

The disadvantages of prior arts lie in that the selection of materials for the liquid crystals in the raster is limited, and the distribution of refractive indices of the liquid crystal layer is limited by deflection of the liquid crystals, such that an angle of view is relatively small, and further, costs of the liquid crystals are relatively high.

SUMMARY OF THE INVENTION

An object of the present invention is to provide a raster, a display apparatus and a method of manufacturing the raster, for increasing the angle of view of the raster and reducing costs of the raster.

According to one embodiment of the present invention, there is provided a raster, comprising:

a first substrate and a second substrate arranged to be opposed to each other, a surface of the first substrate facing the second substrate being provided with a plate electrode thereon, a surface of the second substrate facing the first substrate being provided thereon with a plurality strip electrodes arranged to space apart from each other;

a plurality of spacer walls arranged to respectively correspond to the strip electrodes and located between the first substrate and the second substrate, each of the spacer walls comprising:

a conductive protrusion electrically connected with one of the strip electrodes; and a hydrophilic-hydrophobic conversion material layer covering the conductive protrusion; and a polar liquid layer and a non-polar liquid layer filled between every two adjacent spacer walls.

According to the above technique solution of the present invention, a polar liquid and a non-polar liquid, rather than liquid crystals, are used to equivalently form a lenticular lens raster through different hydrophilic-hydrophobic properties of the polar liquid and the non-polar liquid relative to the hydrophilic-hydrophobic conversion material layer. Since many materials may be selected for the polar liquid and the non-polar liquid, there is a larger difference in refractive index between the two liquids, and a surface radian formed between the two liquids and the hydrophilic-hydrophobic conversion material layer is larger, a range for distribution of the refractive index is larger, an angle of view may be increased, and costs of the liquids are lower compared to the liquid crystals. When a positive voltage is applied to the strip electrode, the hydrophilic-hydrophobic conversion material layer shows a hydrophobic property, a contact angle between the polar liquid and the hydrophilic-hydrophobic conversion material showing the hydrophobic property is larger, an interface between the polar liquid and the non-polar liquid may be maintained to be horizontal, which is equivalent to a plane lens; when no voltage or a negative voltage is applied to the strip electrode, the hydrophilic-hydrophobic conversion material layer shows a hydrophilic property, the interface between the polar liquid and the non-polar liquid presents a convexity protruding toward a side of the polar liquid, which is equivalent to a column convex lens. Thus, switching an image between 3D display and 2D display can also be achieved with the technique solution of the present invention. Further, the liquid crystals of the liquid crystal raster are limited by a temperature, while the raster according to embodiments of the present invention uses liquids which have a better adaptability to a temperature within an ambient environment, and thus may be applied in a hotter or cooler space.

The raster further comprises a hydrophobic layer located on a surface of the plate electrode facing the second substrate, and the hydrophobic layer contacts the polar liquid layer. That is, when a layer of liquid adjacent to the second substrate is a non-polar liquid, and a layer of liquid adjacent to the first substrate is a polar liquid, the hydrophobic layer is provided on the plate electrode.

The raster further comprises a hydrophilic layer located on a surface of the plate electrode facing the second substrate, and the hydrophilic layer contacts the non-polar liquid layer. That is, when a layer of liquid adjacent to the second substrate is a polar liquid, and a layer of liquid adjacent to the first substrate is a non-polar liquid, the hydrophilic layer is provided on the plate electrode.

A material for manufacturing the hydrophobic layer may be selected from common hydrophobic materials. In one embodiment, the hydrophobic layer is made of a polyimide (PI for short) material.

A material for manufacturing hydrophilic layer may be selected from common hydrophilic materials. In one embodiment, the hydrophilic layer is made of polyacrylic resin.

The first substrate and the second substrate are transparent substrates, the plate electrode is a transparent plate electrode, and the strip electrode may be a transparent strip electrode or may be an opaque strip electrode.

In one embodiment, the conductive protrusion is made of a metal material, for example, the metal conductive protrusion is made of copper or gold; or, the conductive protrusion comprises a support protrusion and a conductive layer covering the support protrusion, and the conductive layer is electrically connected with the strip electrode; the conductive layer may also be made of copper or gold.

A section of the spacer wall perpendicular to a plane where the transparent substrate is located may have various shapes, for example, square, triangle and trapezoid. In one embodiment, the section of the spacer wall perpendicular to a plane where the transparent substrate is located is in a shape of trapezoid.

In one embodiment, an internal angle of the trapezoid is selected to be the same as a contact angle of the polar liquid; when the polar liquid is water or aqueous solution, the internal acute angle of the trapezoid is a range of 75~85 degrees. Since use of water is more environmental, the polar liquid is preferably water or aqueous solution.

In the above raster, the spacer walls are arranged on the strip electrodes.

In the above raster, the hydrophilic-hydrophobic conversion material layer is made of 16-mercapto-hexadecanoic acid, or may also be made of other common hydrophilic-hydrophobic conversion materials, such as a polystyrene/nano-titanium dioxide composite coating.

When the conductive protrusion carries positive charges, the 16-mercapto-hexadecanoic acid shows a hydrophobic property and has a larger contact angle with a polar solution, an interface between the polar solution and the non-polar solution is substantially horizontal, light form the display will not be changed after passing through the raster, thereby presenting a 2D display effect; when the conductive protrusion carries negative charges or no charge, the 16-mercapto-hexadecanoic acid shows a hydrophilic property and has a smaller contact angle with the polar solution, the interface between the polar solution and the non-polar solution forms convexity toward a side of the polar solution, which is equivalent to forming a curved lens, that is, a lenticular lens raster is placed at a light output end of the display so as to achieve a 3D display effect.

According to a further embodiment of the present invention, there is provided a display apparatus, comprising a display device and the raster of any one of the above embodiments located on a light output side of the display device.

The above raster may form a plane lens or may form a curved lens when different charges are applied to the strip electrodes, thus the display apparatus may achieve 2D/3D switching.

According to a still further embodiment of the present invention, there is provided a method of manufacturing a raster, comprising steps of:

forming a plurality of strip electrodes, arranged to space apart from each other, on a second substrate;

forming, on each of the strip electrodes, a conductive protrusion and hydrophilic-hydrophobic conversion material layer covering the conductive protrusion, the conductive protrusion and hydrophilic-hydrophobic conversion material layer forming a spacer wall;

providing a non-polar liquid layer and a polar liquid layer between every two adjacent spacer walls;

forming a plate electrode on a first substrate; and assembling the first substrate and the second substrate in a vacuum environment.

In the above method, in the step of forming the plate electrode on the first substrate, a hydrophobic layer is further formed on the plate electrode so that the hydrophobic layer contacts the polar liquid layer.

In the above method, in the step of forming the plate electrode on the first substrate, a hydrophilic layer is further formed on the plate electrode so that the hydrophobic layer contacts the non-polar liquid layer.

In the above method, the step of forming on each of the strip electrodes, the conductive protrusion comprises:

forming the conductive protrusion from a metal material; or, forming a support protrusion on each of the strip electrodes, and forming a conductive layer to cover the support protrusion, the conductive layer being electrically connected with the strip electrode.

In the above method, the step of forming the conductive protrusion from the metal material comprises forming a metal layer having a predetermined thickness on the formed strip electrodes through a sputtering process or an electroplating process, and patterning the metal layer by using mask patterning processes so as to form the conductive protrusion.

In the above method, the step of forming the support protrusion on each of the strip electrodes and forming the conductive layer to cover the support protrusion comprises coating a silicon nitride layer over the second substrate formed with the strip electrodes, forming the support protrusion through exposing and dry etching processes, and depositing a conductive layer on the support protrusion.

In the above method, 16-mercapto-hexadecanoic acid is applied onto the second substrate formed with the conductive protrusions so as to form the spacer walls.

DETAILED DESCRIPTION OF PREFERRED EMBODIMENTS OF THE INVENTION

Technical solutions in embodiments of the present invention will be described explicitly and completely hereinafter with reference to the attached drawings. It would be apparent that the described embodiments are only some, rather than all, of the embodiments of the present invention. Other ways of carrying out the invention obtained based on the embodiments in the description by those skilled in the art without a creative work shall fall within the scope of the present invention.

According to a general inventive concept of the present invention, in order to increase an angle of view of a raster and reduce a cost of the raster, there is provided a raster, comprising: a first substrate and a second substrate arranged to be opposed to each other, a surface of the first substrate facing the second substrate being provided with a plate electrode thereon, a surface of the second substrate facing the first substrate being provided thereon with a plurality strip electrodes arranged to space apart from each other; a plurality of spacer walls arranged to respectively correspond to the strip electrodes and located between the first substrate and the second substrate; and a polar liquid layer and a non-polar liquid layer filled between every two adjacent spacer walls. Each of the spacer walls comprises: a conductive protrusion electrically connected with one of the strip electrode; and a hydrophilic-hydrophobic conversion material layer covering the conductive protrusion.

In the raster according to embodiments of the present invention, many materials may be selected for the polar liquid layer and the non-polar liquid layer, there is a larger difference in refractive index between the two liquid layers, and a surface radian formed between the two liquid layers and the hydrophilic-hydrophobic conversion material layer is larger, therefore a range for distribution of the refractive index is larger, an angle of view may be increased, and costs of the liquids are lower compared to the liquid crystals.

Figure 1:
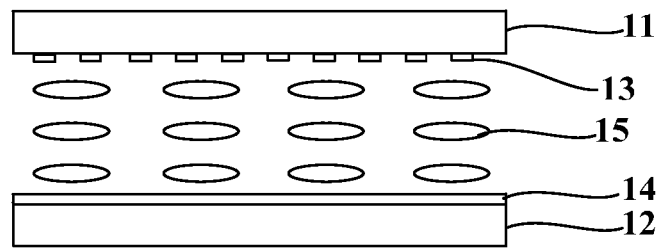
FIG. 1 is a schematic structural diagram of a liquid crystal raster in prior arts.
Figure 2:
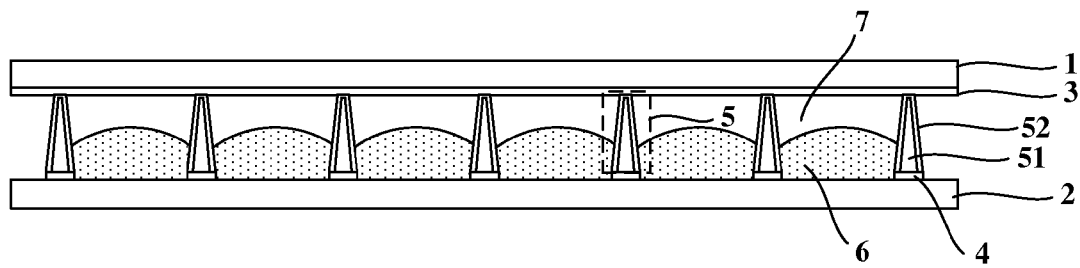
FIG. 2 is a schematic structural diagram of a raster according to a first exemplary embodiment of the present invention.

FIG. 2 is a schematic structural diagram of a raster according to a first exemplary embodiment of the present invention. The raster comprises: a first substrate 1 and a second substrate 2 arranged to be opposed to each other, a plurality of spacer walls 5, and a polar liquid layer and a non-polar liquid layer. A surface of the first substrate 1 facing the second substrate 2 is provided with a plate electrode 3 thereon, a surface of the second substrate 2 facing the first substrate 1 is provided thereon with a plurality strip electrodes 4 arranged to space apart from each other. The plurality of spacer walls 5 are arranged to respectively correspond to the strip electrodes 4 and located between the first substrate 1 and the second substrate 2, each spacer wall 5 comprises a conductive protrusion 51 electrically connected with a respective strip electrode 4 and a hydrophilic-hydrophobic conversion material layer 52 covering the conductive protrusion 51. A polar liquid layer 7 and a non-polar liquid layer 6 are filled into a space between every two adjacent spacer walls 5, and are separated into two layers in a highness direction of the spacer walls 5.

In an embodiment of the present invention, positions of the non-polar liquid layers 6 and the polar liquid layers 7 are not limited to those shown in FIG. 2, that is, positions of the non-polar liquid layers 6 and the polar liquid layers 7 shown in FIG. 2 are interchangeable. In the raster according to the embodiments of the present invention, the non-polar liquid layer 6 and the polar liquid layer 7, rather than liquid crystals, are used, such that refractive indices of the polar liquid layer 7 and the non-polar liquid layer 6 may be changed based on their different hydrophilic-hydrophobic properties relative to the hydrophilic-hydrophobic conversion material layer 52. For example, when no voltage or a negative voltage is applied to a strip electrode 4, the hydrophilic-hydrophobic conversion material layer 52 shows a hydrophilic property, an interface between a non-polar liquid layer 6 and a polar liquid layer 7 forms a convexity protruding toward a side of the polar liquid layer 7, which is equivalent to a column convex lens. Since many materials may be selected for the polar liquid layer 7 and the non-polar liquid layer 6, a larger difference in refractive index between the two liquid layers can be achieved, and a surface radian formed by the two liquid layers is larger, a range for distribution of the refractive index is larger, an angle of view may be increased, and costs of the liquids are lower as compared to the liquid crystals. Further, the liquid crystals of the liquid crystal raster are limited by temperature, while the raster according to embodiments of the present invention uses liquids which have a better adaptability to ambient temperature, and thus may be applied in a hotter or cooler space.

Figure 3:
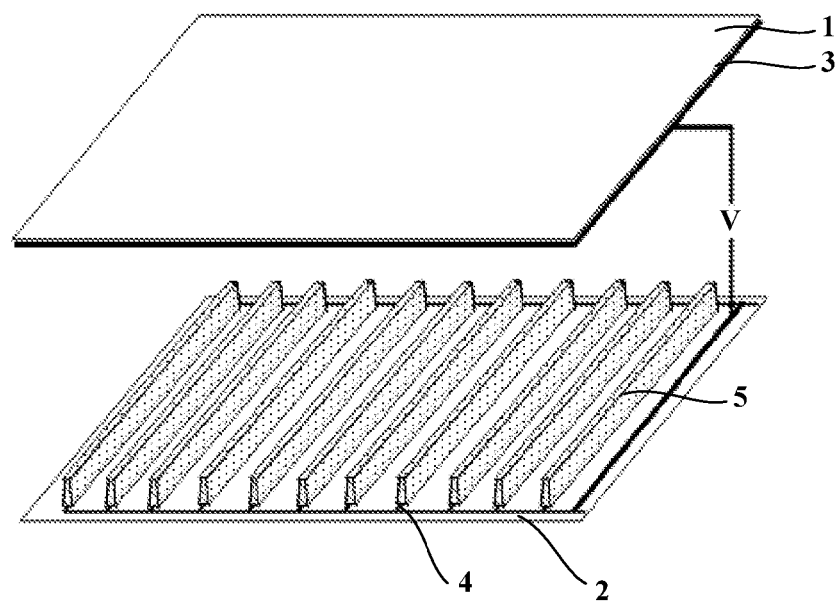
FIG. 3 is a schematic perspective and exploded view of the raster shown in FIG. 2.

FIG. 3 is a schematic perspective and exploded view of the raster shown in FIG. 2, wherein the polar liquid layers and the non-polar liquid layers are not shown in this figure. As shown in FIG. 3, a plate electrode 3 is provided on the first substrate 1, a plurality of strip electrodes 4, which are spaced apart from each other, are arranged on the second substrate 2, spacer walls 5 are arranged on the strip electrodes 4. There are the polar liquid layer and the non-polar liquid layer between every two adjacent spacer walls 5.

Figure 4:
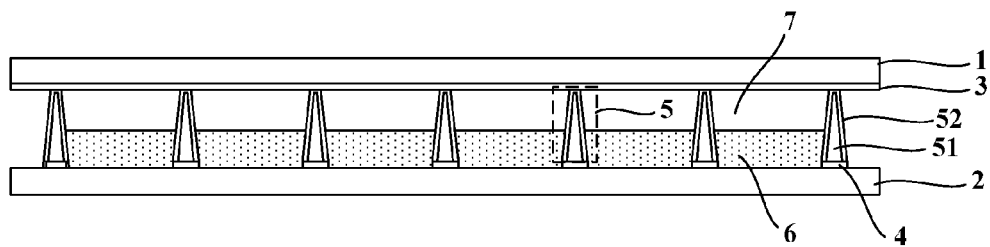
FIG. 4 is a schematic diagram showing an operating state of the raster shown in FIG. 2 when voltages are applied to strip electrodes.

Continuing to refer to FIG. 2, when no voltage or a negative voltage is applied to the strip electrodes 4, the hydrophilic-hydrophobic conversion material layers 52 show a hydrophilic property, the interfaces between the non-polar liquid layers 6 and the polar liquid layers 7 form convexities protruding toward the side of the polar liquid layers 7, that is, a plurality of convex lenses are formed. As shown in FIG. 4, when a positive voltage is applied to the strip electrodes 4, the hydrophilic-hydrophobic conversion material layers 52 show a hydrophobic property, the interfaces between the polar liquid and the non-polar liquid may be maintained to be horizontal, which is equivalent to a plane lens. Thus, a 2D display of the images and a conversion from 2D display to 3D display can also be achieved with the raster according to embodiments of the present invention.

In one exemplary embodiment, the polar liquid layer 7 may be selected from water, inorganic aqueous solution, for example, NaCl aqueous solution, KCl aqueous solution, or the like; the non-polar liquid layer 6 may be selected from colorless and transparent oil, for example, phenyl methyl silicone oil, which has a refractive index of 1.425 and a density of 1.07. The polar liquid layer 7 and the non-polar liquid layer 6 may be selected such that there is a relatively large difference in density therebetween so as to ensure a relative positional relationship between the two liquid layers when the raster is moved. Specifically, the "relative positional relationship" is an upper-lower positional relationship between the polar liquid layer 7 and the non-polar liquid layer 6. It should be noted that the terms "upper", "lower" used herein are only relative orientations, which are not limited in the present invention.

Figure 5:
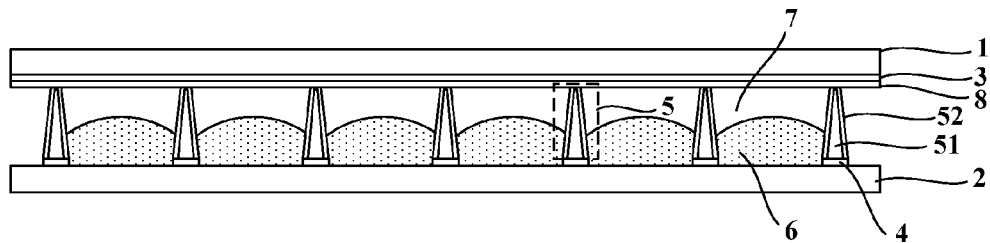
FIG. 5 is a schematic structural diagram of a raster according to a second exemplary embodiment of the present invention.

FIG. 5 is a schematic structural diagram of a raster according to a second exemplary embodiment of the present invention. As shown in FIG. 5, when non-polar liquid layer 6 is adjacent to the second substrate 2, and the polar liquid layer 7 is adjacent to the first substrate 1, the raster further comprises a hydrophobic layer 8 located on a surface of the plate electrode 3 facing the second substrate 2, that is, the hydrophobic layer 8 contacts the polar liquid layer 7. Such an arrangement will facilitate to differentiate the liquid interface, and prevent the non-polar liquid layer 6 and the polar liquid layer 7 from being distributed in an undesired manner.

Figure 6:
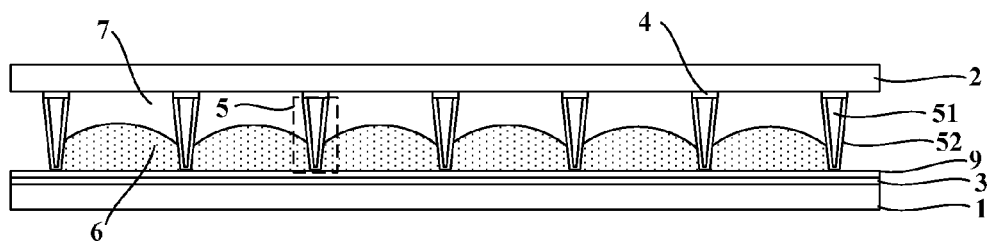
FIG. 6 is a schematic structural diagram of a raster according to a third exemplary embodiment of the present invention.

FIG. 6 is a schematic structural diagram of a raster according to a third exemplary embodiment of the present invention. As shown in FIG. 6, when the polar liquid layer 7 is adjacent to the second substrate 2, and the non-polar liquid layer 6 is adjacent to the first substrate 1, the raster further comprises a hydrophilic layer 9 located on a surface of the plate electrode 3 facing the second substrate 2, that is, the hydrophilic layer 9 contacts the non-polar liquid layer 6. Such an arrangement will facilitate to differentiate the liquid interface, and prevent the non-polar liquid layer 6 and the polar liquid layer 7 from being distributed in an undesired manner.

A material for manufacturing the hydrophobic layer 8 may be a common hydrophobic material. For example, the hydrophobic layer 8 is made of a polyimide (PI for short) material.

A material for manufacturing hydrophilic layer 9 may be a common hydrophilic material. For example, the hydrophilic layer 9 is made of polyacrylic resin. There is no particular requirement for thicknesses of the hydrophobic layer 8 and the hydrophilic layer as long as uniformity of the films of the hydrophobic layer and the hydrophilic layer can be ensured; in general, the thicknesses are set to be 400 Å~2000 Å.

The first substrate 1 and the second substrate 2 are transparent substrates, the plate electrode 3 is a transparent plate electrode, and the strip electrodes 4 may be transparent strip electrodes or opaque strip electrodes. A material for manufacturing the transparent electrodes may be ITO (Indium Tin Oxide) or IZO (Indium Zinc Oxide), and a thickness of the transparent electrodes is generally 400 Å~2000 Å.

Continuing to refer to FIG. 2, in one embodiment, the conductive protrusion 51 is made of a metal conductive material, for example, a material for manufacturing the metal conductive protrusion may be copper or gold. In an alternative embodiment, the conductive protrusion 51 comprises a support protrusion and a conductive layer covering the support protrusion, and the conductive layer is electrically connected with the strip electrode 4. A material for manufacturing the conductive layer may also be copper or gold. The support protrusion mainly functions to support the spacer wall, and may be made of a material such as silicon nitride. Since only the conductive layer is electrically connected with the strip electrode 4 and a depositing thickness of the conductive layer is relative small during manufacturing of the conductive layer, the implementation, in which the conductive protrusion 51 comprises the support protrusion and the conductive layer covering the support protrusion, may also improve production efficiency.

As shown in FIGS. 2 and 4-6, a section of the spacer wall 5 perpendicular to a plane where the transparent substrate is located may have various shapes, for example, square, triangle and trapezoid; preferably, the sectional shape of the spacer wall 5 perpendicular to a plane where the transparent substrate is located is a trapezoid.

An internal angle of the trapezoid is selected to be the same as a contact angle of the polar liquid layer 7 with the hydrophilic-hydrophobic conversion material presenting a hydrophilic property. For example, when the polar liquid layer 7 is water or an aqueous solution, the internal acute angle of the trapezoid is designed to be 75~85 degrees. Since water is more environmentally friendly, the polar liquid for forming the polar liquid layer 7 may be water or an aqueous solution.

As shown in FIGS. 2-6, the spacer wall 5 is arranged on the strip electrode 4, and the conductive protrusion 51 of the spacer wall 5 is electrically connected with the strip electrode 4. As such, the hydrophilic-hydrophobic conversion material layer 52 covering the conductive protrusion 51 may present a hydrophilic property or a hydrophobic property depending on an on-off state and/or a polarity of the strip electrode 4.

For the raster of any one of the above various embodiments, the hydrophilic-hydrophobic conversion material layer 52 is made of 16-mercapto-hexadecanoic acid, the present invention, however, is not limited to this. Other common hydrophilic-hydrophobic conversion materials, for example, a polystyrene/nano-titanium dioxide composite coating may also be used.

When the conductive protrusion 51 carries positive charges, the 16-mercapto-hexadecanoic acid shows a hydrophobic property and has a larger contact angle with the polar solution, an interface between the polar solution 7 and the non-polar solution 6 is substantially horizontal, thus light form the display will not be changed after passing through the raster, thereby presenting a 2D display effect; when the conductive protrusion 52 carries negative charges or no charge, the 16-mercapto-hexadecanoic acid shows a hydrophilic property and has a smaller contact angle with the polar solution, the interface between the polar solution 7 and the non-polar solution 6 forms convexity toward a side of the polar solution, which is equivalent to a curved lens. That is, a lenticular lens raster is placed at a light output end of the display so as to achieve a 3D display effect, thereby achieving 2D/3D display switching.

Figure 7:
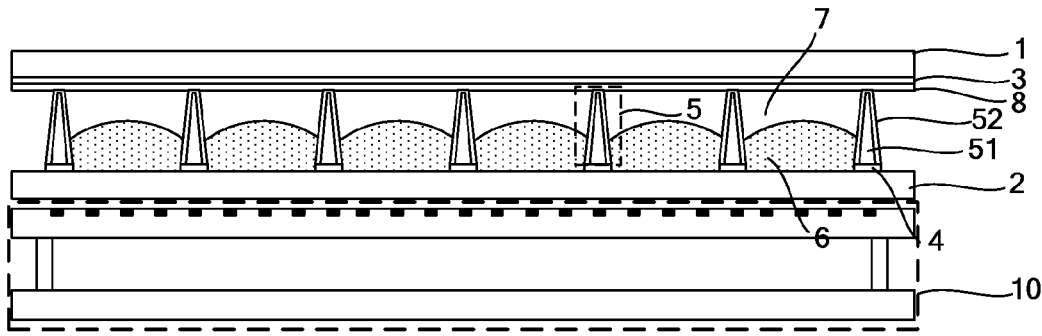
FIG. 7 is a schematic structural diagram of a display apparatus according to an exemplary embodiment of the present invention.

Embodiments of the present invention further provide a display apparatus. As shown in FIG. 7, the display apparatus comprises a display device 10 and the raster according to any one of the above embodiments located on a light output side of the display device 10.

The above raster may form a plane lens or may form a curved surface lens when different charges are applied to the strip electrodes 4, thus the display apparatus may be used as a 2D/3D switchable display apparatus.

In the display apparatus according to embodiments of the present invention, if the display device 10 is a liquid crystal panel, the strip electrodes 4 may be located at a position corresponding to and above black matrixes of a color filter substrates, for example, 4~5 pixels may be set to correspond to one strip electrode 40.

Figure 8:
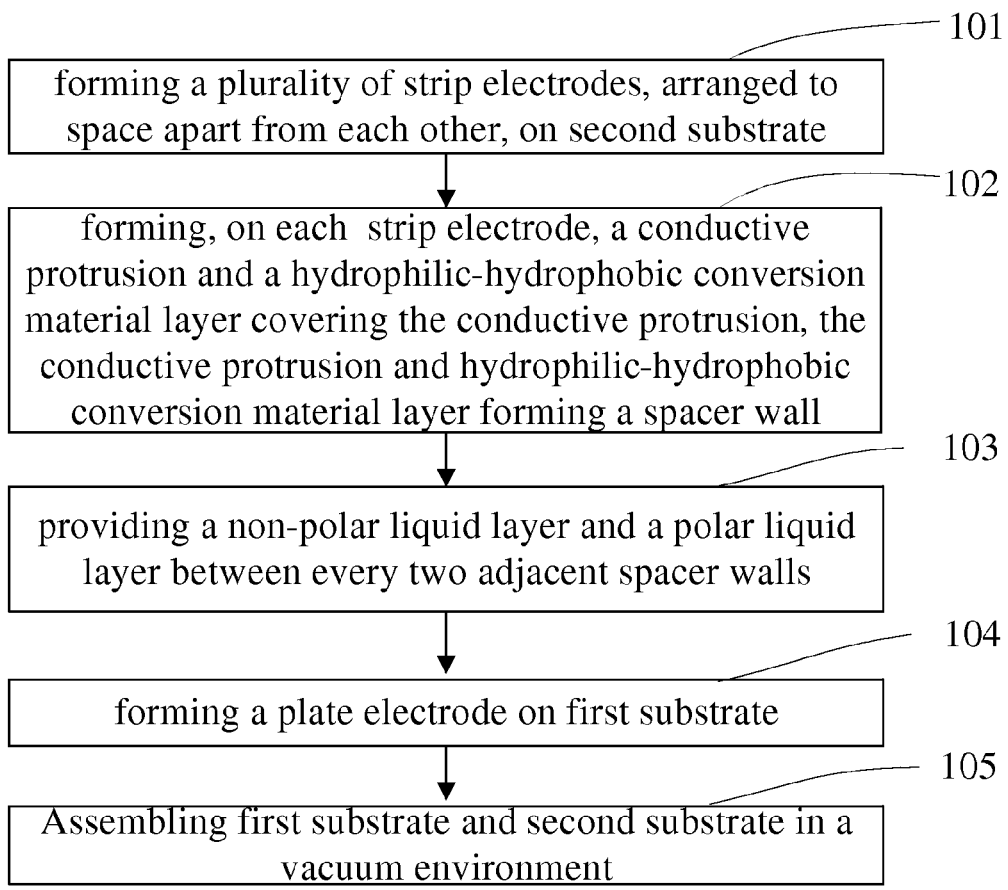
FIG. 8 is a flowchart showing a method of manufacturing a raster according to an exemplary embodiment of the present invention.

According to a still further embodiment of the present invention, there is provided a method of manufacturing a raster, and as shown in FIG. 8, the method comprises steps as follows:

step 101, forming a plurality of strip electrodes spaced apart from each other on a second substrate;

step 102, forming, on each of the strip electrodes, a conductive protrusion and a hydrophilic-hydrophobic conversion material layer covering the conductive protrusion, the conductive protrusion and hydrophilic-hydrophobic conversion material layer forming a spacer wall;

step 103, providing a non-polar liquid layer and a polar liquid layer between every two adjacent spacer walls;

step 104, forming a plate electrode on the first substrate; and step 105, assembling the first substrate and the second substrate in a vacuum environment.

It should be noted that the step 104 may be implemented simultaneously with the steps 101 to 103, or may be implemented before the step 101, as long as the manufacture of the first substrate and the second substrate is finished before assembling the first substrate and the second substrate in a vacuum environment.

In a further embodiment, before assembling the first substrate and the second substrate in a vacuum environment, the method further comprises, after the step of forming the plate electrode on the first substrate, forming a hydrophobic layer on the plate electrode such that the hydrophobic layer contacts the polar liquid layer.

In another embodiment, before assembling the first substrate and the second substrate in a vacuum environment, the method further comprises, after the step of forming the plate electrode on the first substrate further, forming a hydrophilic layer on the plate electrode so that the hydrophobic layer contacts the non-polar liquid layer.

In one embodiment, the step of forming the conductive protrusion on each of the strip electrodes comprises forming the conductive protrusion from a metal material. In an alternative embodiment, the step of forming the conductive protrusion on each of the strip electrodes comprises forming a support protrusion on each of the strip electrodes, and forming a conductive layer covering the support protrusion such that the conductive layer is electrically connected with the strip electrode.

A specific process flow for manufacturing the raster is described hereinafter by taking the raster according to the embodiment shown in FIG. 2 as an example:

manufacturing processes on the first substrate: a plate electrode is formed on the first substrate, for example, through sputtering deposition, a material for forming the plate electrode may be, for example, a transparent conductive layer such as ITO, IZO or the like, a thickness of the plate electrode is generally 400 Å~2000 Å, and a glass substrate is used as a base substrate;

manufacturing processes on the second substrate: in the step of forming the strip electrodes on the second substrate, the strip electrodes may be made of metal; in case of manufacturing the strip electrodes from metal, a metal layer is firstly deposited and a thickness of the metal layer is about hundreds of angstrom, then a plurality of spaced apart strip electrodes are formed through masking patterning processes (the masking patterning processes usually include processes such as cleaning, film-forming, coating photoresist, exposing, development, dry etching or wet etching, photoresist peeling-off);

thereafter, conductive protrusions are manufactured on a region corresponding to the formed strip metal electrodes; in case the conductive protrusions are made of metal materials, a metal layer having a certain thickness is formed through a sputtering process or an electroplating process, then the metal layer is patterned by using mask patterning processes, where a dry etching way is used and an etching rate is controlled so as to form metal conductive protrusions having a certain angle. Process parameters for forming the metal conductive protrusions may be set by those skilled in the art according to specific processes and capacity of equipment;

in the circumstance that the conductive protrusion conductive protrusion comprises the support protrusion and the conductive layer covering the support protrusion, a silicon nitride ($SiN_x$) layer is coated on the second substrate formed with the strip electrodes and is processed by exposing, etching and the like so as to form the support protrusion, a bottom width of the support protrusion is not larger than a line width of the patterned strip electrodes on the second substrate; a conductive layer is deposited on the support protrusion, for example, the conductive layer may be a metal layer, and the deposited metal layer is electrically connected with the strip electrodes, which is helpful in reducing the thickness of the metal layer and improving production efficiency;

thereafter, coating, on the second substrate formed with the conductive protrusions, a layer of hydrophilic-hydrophobic conversion material, for example, 16-mercaptohexadecanoic acid (MHA for short). When coating the MHA on the second substrate formed with the conductive protrusions, the MHA is self-bonded to the conductive protrusions so as to form spacer walls, and undesired parts of the MHA are etched off through a dry etching process so that only the parts of the MHA on the surfaces of the conductive protrusions are remained;

thereafter, a box dam is formed on the second substrate, the box dam is generally made of a sealant and coated onto peripheral edges of the second substrate so as to enclose devices therein; the box dam is coated onto the peripheral edges of the second substrate by a gluing head; after drip-filling a liquid for the non-polar liquid layer and a liquid for the polar liquid layer, the second substrate is assembled with the first substrate in a vacuum environment, and the sealant is photo-cured, thereby obtaining the raster, which may also be called as a 2D/3D switching control screen.

For the display apparatus, it is only required to joint the 2D/3D switching control screen to a display by an optical adhesive so as to finish the manufacture of the display apparatus.

It would be apparent that the person skilled in the art may make various changes or modifications to the present invention without departing from spirit and scopes of the disclosure. Thus, if these changes or modifications to embodiments of the present invention fall within scopes of claims and equivalents thereof of the present invention, the present invention is intended to include these changes or modifications therein.

What is claimed is:

1. A raster, comprising:
    a first substrate and a second substrate arranged to be opposed to each other, a surface of the first substrate facing the second substrate being provided with a plate electrode thereon, a surface of the second substrate facing the first substrate being provided thereon with a plurality of strip electrodes arranged spaced apart from each other;
    a plurality of spacer walls arranged to respectively correspond to the strip electrodes and located between the first substrate and the second substrate, each of the spacer walls comprising:
    a conductive protrusion electrically connected with one of the strip electrodes; and
    a hydrophilic-hydrophobic conversion material layer covering and directly contacting the conductive protrusion and configured to show a hydrophilic property when no voltage or a negative voltage is applied to the one of the strip electrodes and show a hydrophobic property when a positive voltage is applied to the one of the strip electrodes; and
    a polar liquid layer and a non-polar liquid layer filled between every two adjacent spacer walls.

2. The raster according to claim 1, further comprising a hydrophobic layer located on a surface of the plate electrode facing the second substrate, the hydrophobic layer contacting the polar liquid layer.

3. The raster according to claim 2, wherein the hydrophobic layer is made of polyimide.

4. The raster according to claim 1, further comprising a hydrophilic layer located on a surface of the plate electrode facing the second substrate, the hydrophilic layer contacting the non-polar liquid layer.

5. The raster according to claim 4, wherein the hydrophilic layer is made of polyacrylic resin.

6. The raster according to claim 1, wherein the conductive protrusion is made of a metal material; or,
the conductive protrusion comprises a support protrusion and a conductive layer covering the support protrusion, the conductive layer being electrically connected with the strip electrode.

7. The raster according to claim 1, wherein the polar liquid layer is formed from water or an aqueous solution, a section of the spacer wall perpendicular to a plane where the substrate is located is in the shape of a trapezoid, an internal acute angle of the trapezoid is in a range of 75~85 degrees.

8. The raster according to claim 1, wherein the spacer walls are arranged on the strip electrodes.

9. The raster according to claim 1, wherein the hydrophilic-hydrophobic conversion material layer is made of 16-mercapto-hexadecanoic acid.

10. A display apparatus, comprising a display device and the raster according to claim 1 located on a light output side of the display device.

11. A method of manufacturing a raster, characterized in that the method comprises steps of:
forming a plurality of strip electrodes, arranged spaced apart from each other on a second substrate;
forming, on each of the strip electrodes, a conductive protrusion and a hydrophilic-hydrophobic conversion material layer covering and directly contacting the conductive protrusion, the conductive protrusion and hydrophilic-hydrophobic conversion material layer forming a spacer wall, the hydrophilic-hydrophobic conversion material layer is being configured to show a hydrophilic property when no voltage or a negative voltage is applied to a corresponding strip electrode and show a hydrophobic property when a positive voltage is applied to the corresponding strip electrode;
providing a non-polar liquid layer and a polar liquid layer between every two adjacent spacer walls;
forming a plate electrode on a first substrate; and
assembling the first substrate and the second substrate in a vacuum environment so that the plate electrode faces the strip electrodes.

12. The method according to claim 11, wherein the method further comprises, after the step of forming the plate electrode on the first substrate, forming a hydrophobic layer on the plate electrode so that the hydrophobic layer contacts the polar liquid layer.

13. The method according to claim 11, wherein the method further comprises, after the step of forming the plate electrode on the first substrate, forming a hydrophilic layer on the plate electrode so that the hydrophobic layer contacts the non-polar liquid layer.

14. The method according to claim 11, wherein the step of forming, on each of the strip electrodes, the conductive protrusion comprises:
forming the conductive protrusion from a metal material; or,
forming a support protrusion on each of the strip electrodes, and forming a conductive layer to cover the support protrusion, the conductive layer being electrically connected with the strip electrode.

15. The method according to claim 14, wherein the step of forming the conductive protrusion from the metal material comprises forming a metal layer having a predetermined thickness on the formed strip electrodes through a sputtering process or an electroplating process, and patterning the metal layer by using mask patterning processes so as to form the conductive protrusion.

16. The method according to claim 14, wherein the step of forming the support protrusion on each of the strip electrodes and forming the conductive layer to cover the support protrusion comprises coating a silicon nitride layer over the second substrate formed with the strip electrodes, forming the support protrusion through exposing and dry etching processes, and depositing the conductive layer on the support protrusion.

17. The method according to claim 15, wherein 16-mercapto-hexadecanoic acid is applied onto the second substrate formed with the conductive protrusions so as to form the hydrophilic-hydrophobic conversion material layer.

18. The method according to claim 16, wherein 16 mercapto-hexadecanoic acid is applied onto the second substrate formed with the conductive protrusions so as to form the hydrophilic-hydrophobic conversion material layer.

19. The raster according to claim 2, wherein
the conductive protrusion is made of metal material; or
the conductive protrusion comprises a support protrusion and a conductive layer covering the support protrusion, the conductive layer being electrically connected with the strip electrode.

20. The raster according to claim 4, wherein
the conductive protrusion is made of metal material; or
the conductive protrusion comprises a support protrusion and a conductive layer covering the support protrusion, the conductive layer being electrically connected with the strip electrode.

* * * * *